May 11, 1954   W. M. DAVIS, SR   2,678,070
AUTOMATIC CURVE CUTTING SAWING APPARATUS
Filed July 28, 1952   8 Sheets-Sheet 3
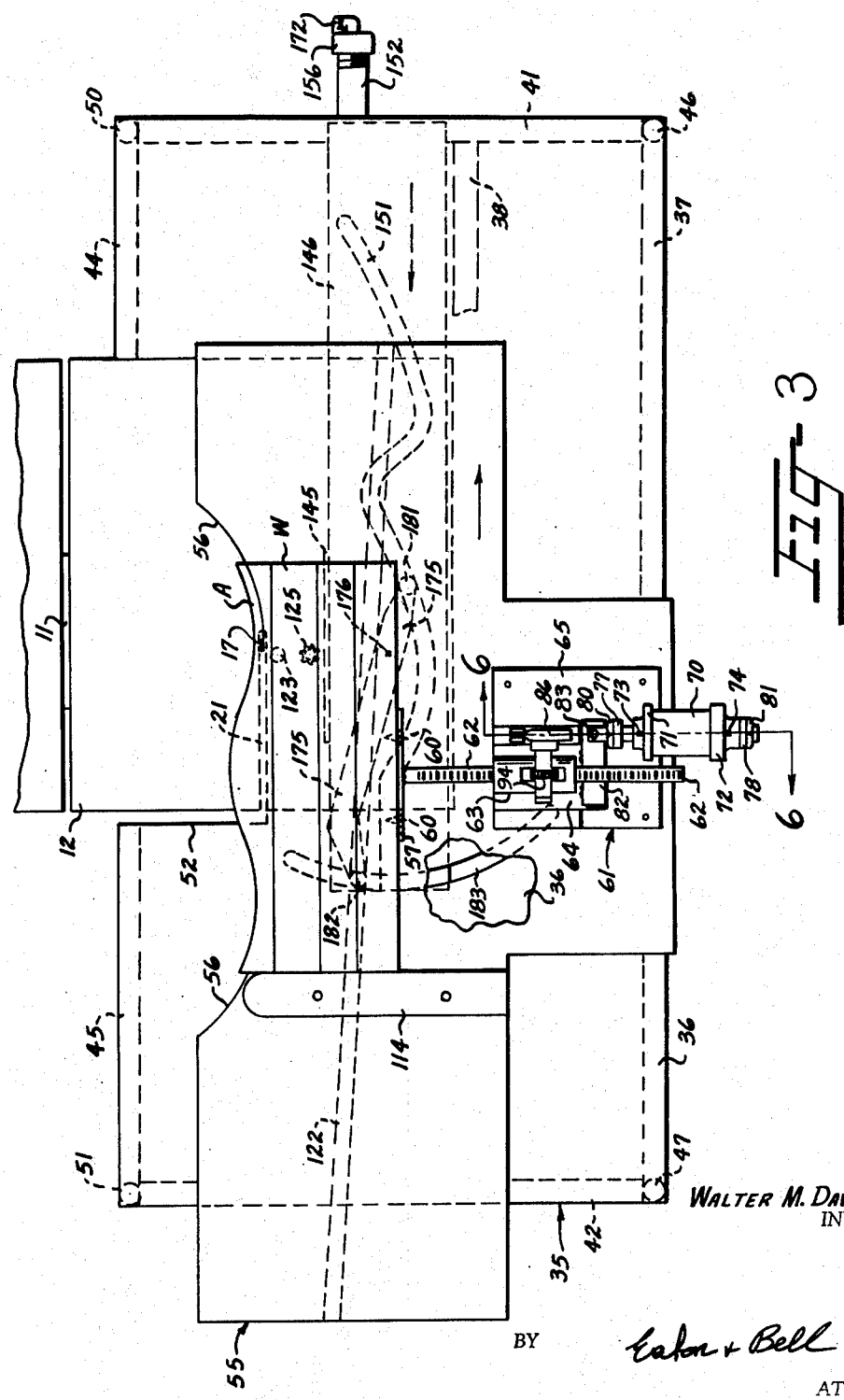
WALTER M. DAVIS, SR.
INVENTOR.
BY Eaton + Bell
ATTORNEYS.

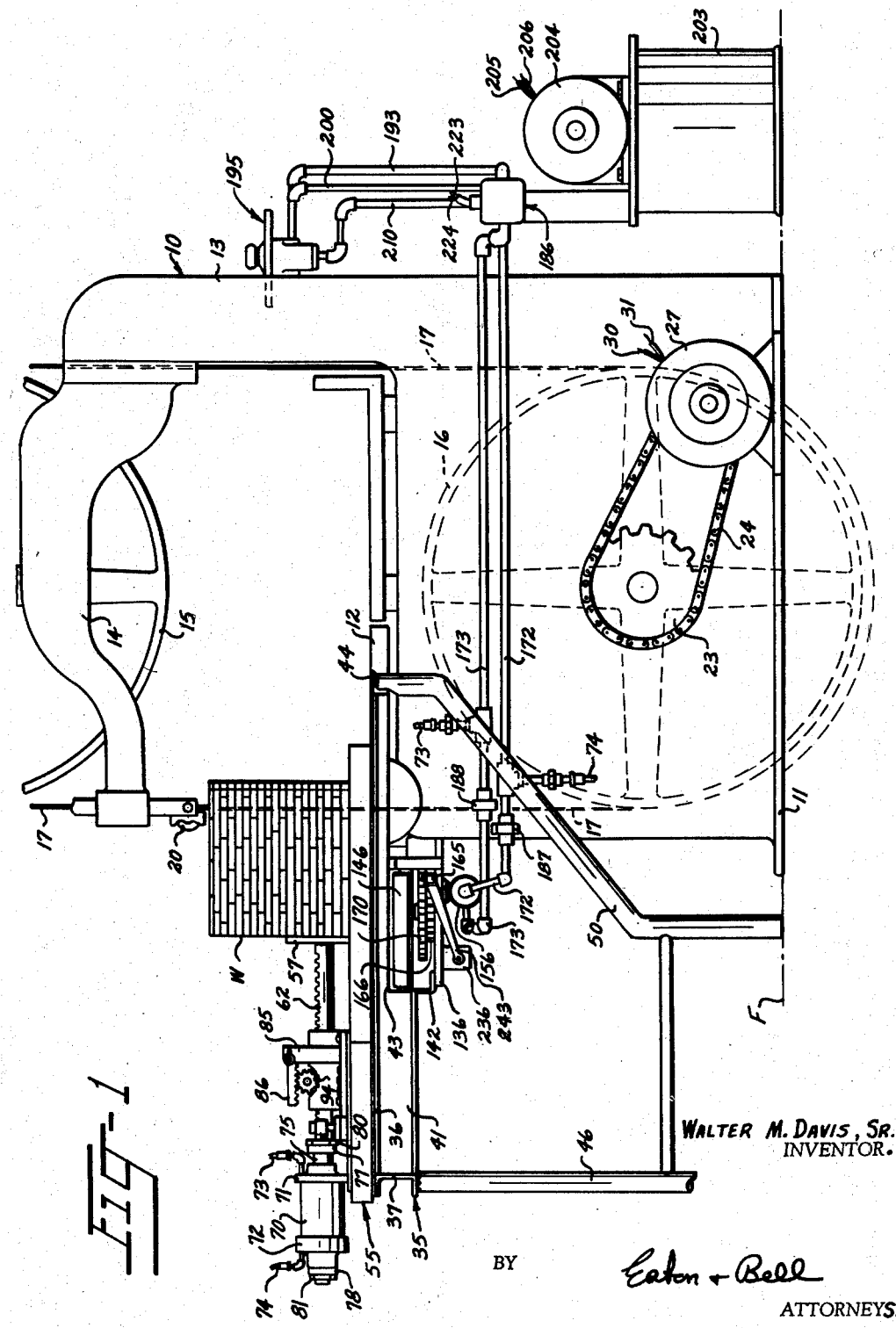

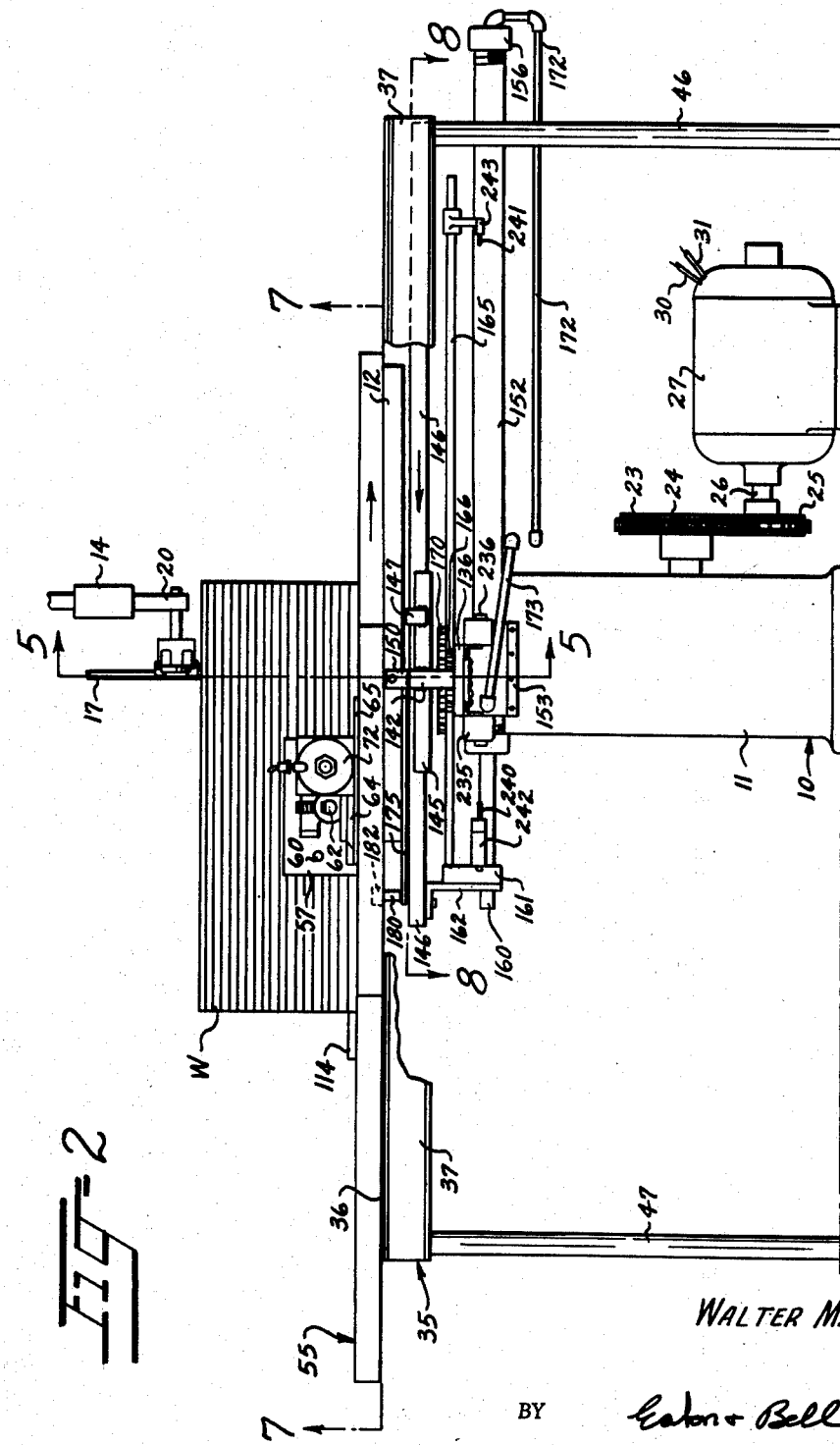

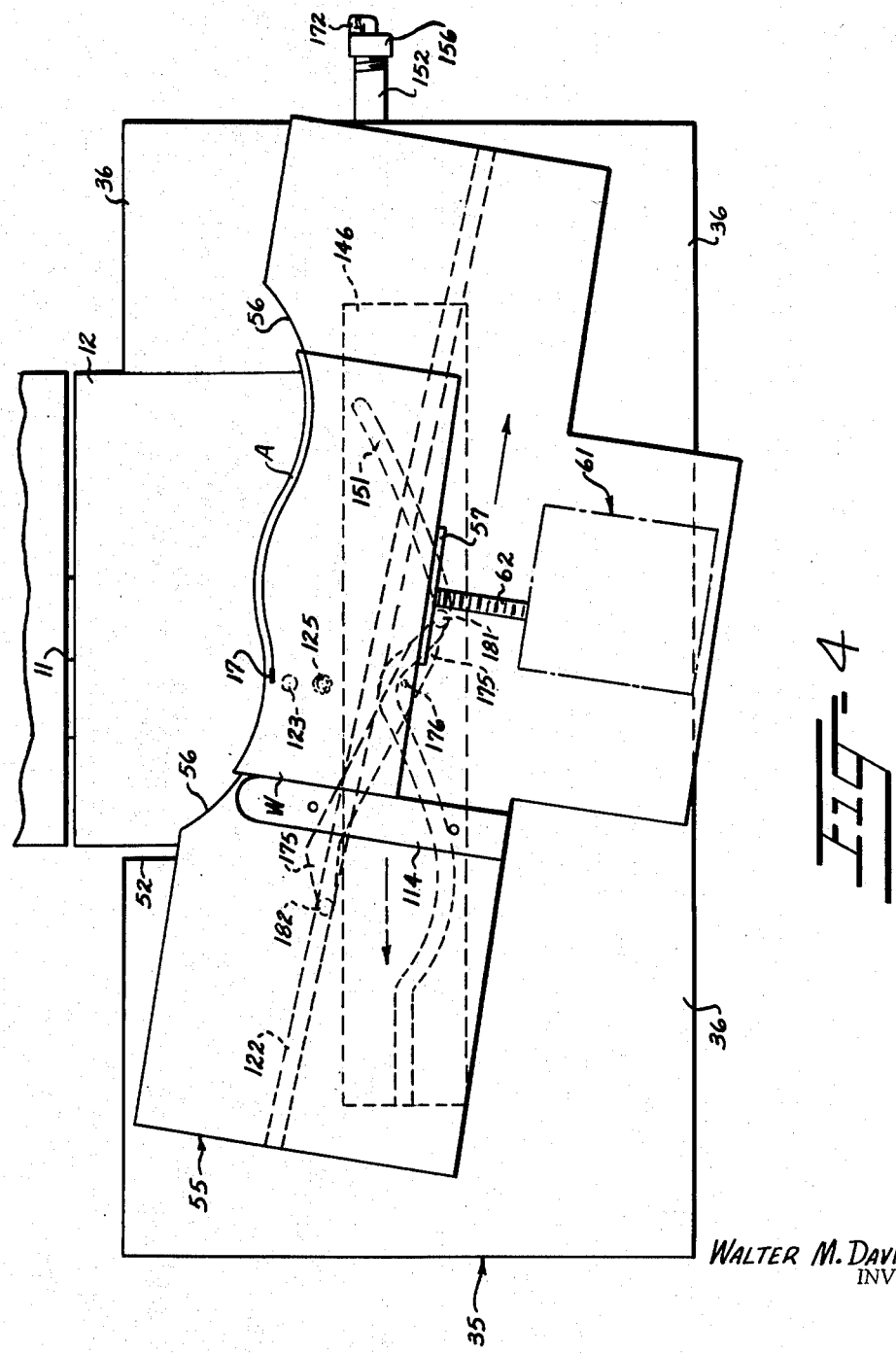

May 11, 1954　　W. M. DAVIS, SR　　2,678,070
AUTOMATIC CURVE CUTTING SAWING APPARATUS
Filed July 28, 1952　　8 Sheets-Sheet 5
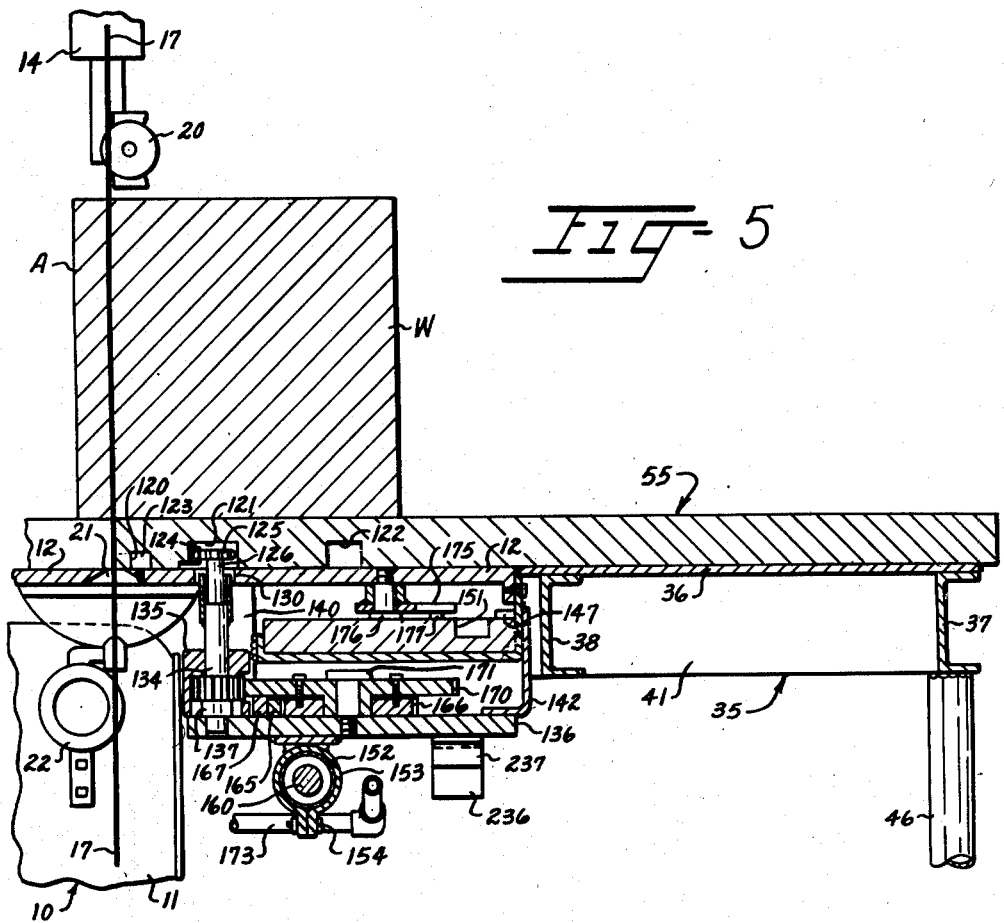
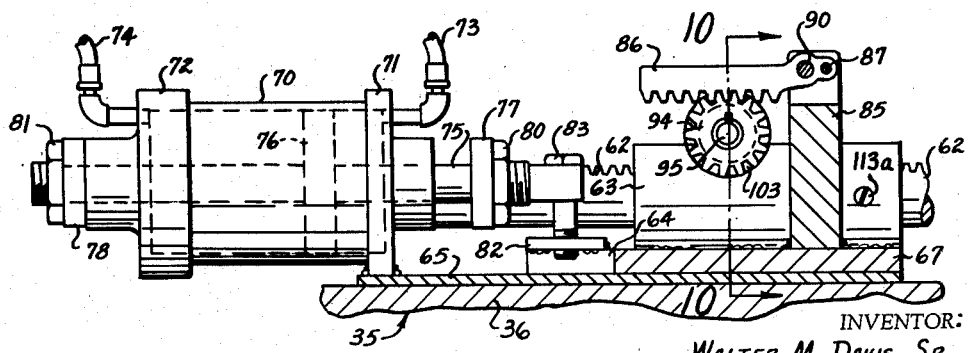
INVENTOR:
WALTER M. DAVIS, SR.
BY
ATTORNEYS May 11, 1954     W. M. DAVIS, SR     2,678,070
AUTOMATIC CURVE CUTTING SAWING APPARATUS
Filed July 28, 1952     8 Sheets-Sheet 6
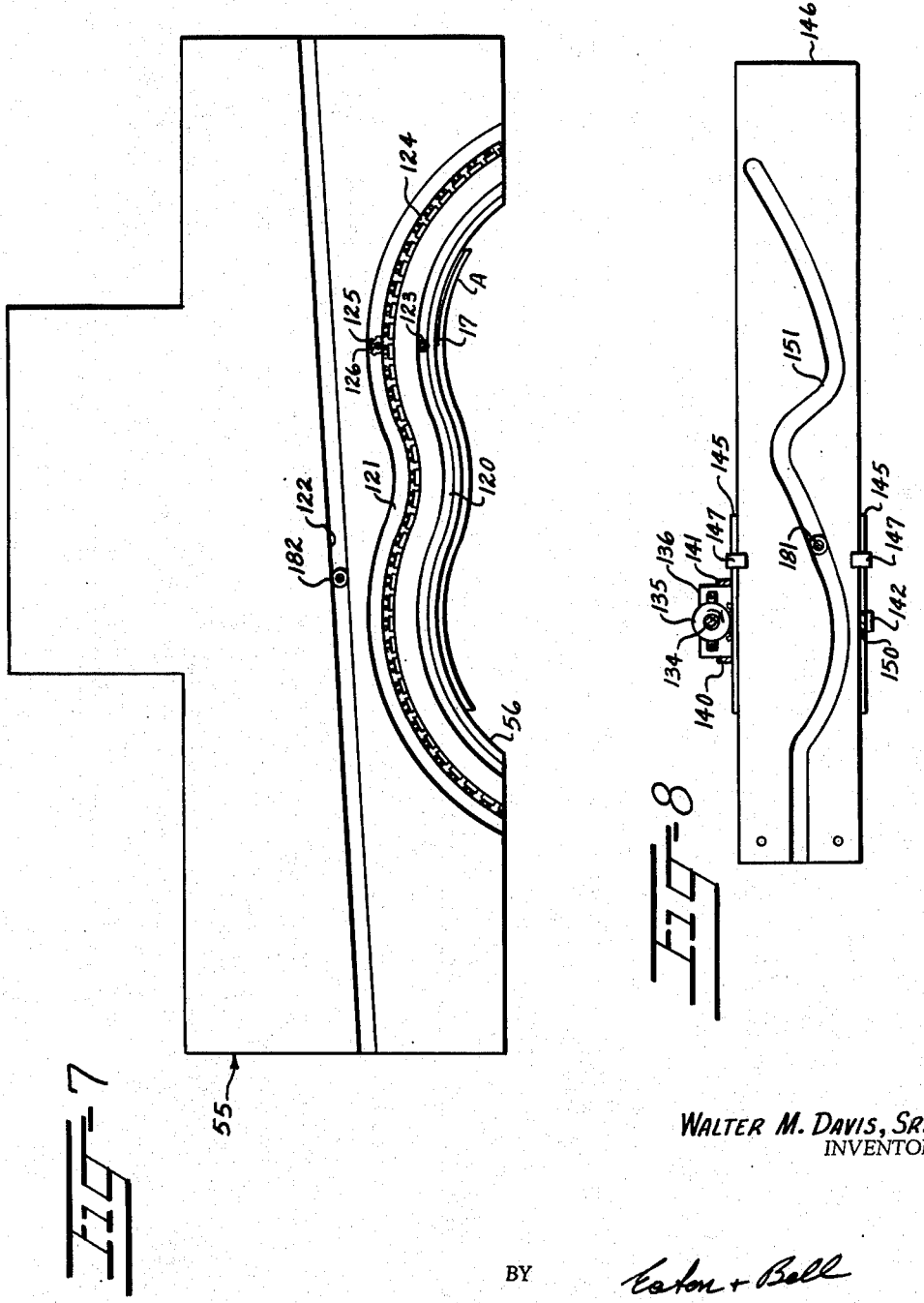
WALTER M. DAVIS, SR.
INVENTOR.
BY *Eaton + Bell*
ATTORNEYS May 11, 1954  W. M. DAVIS, SR  2,678,070
AUTOMATIC CURVE CUTTING SAWING APPARATUS
Filed July 28, 1952  8 Sheets-Sheet 7
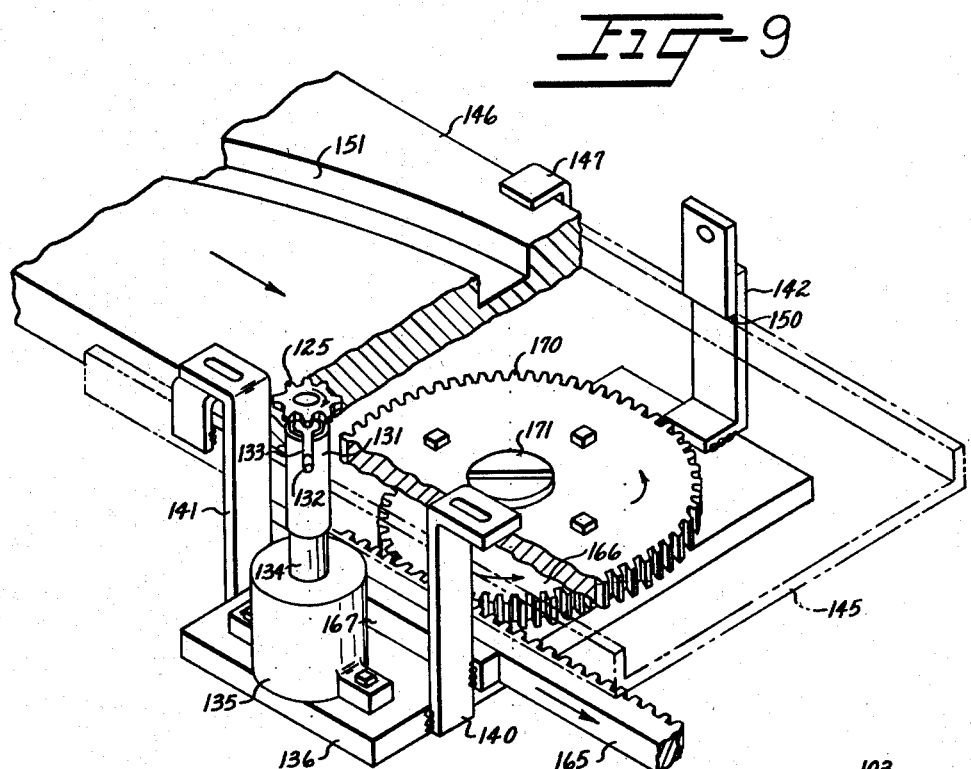
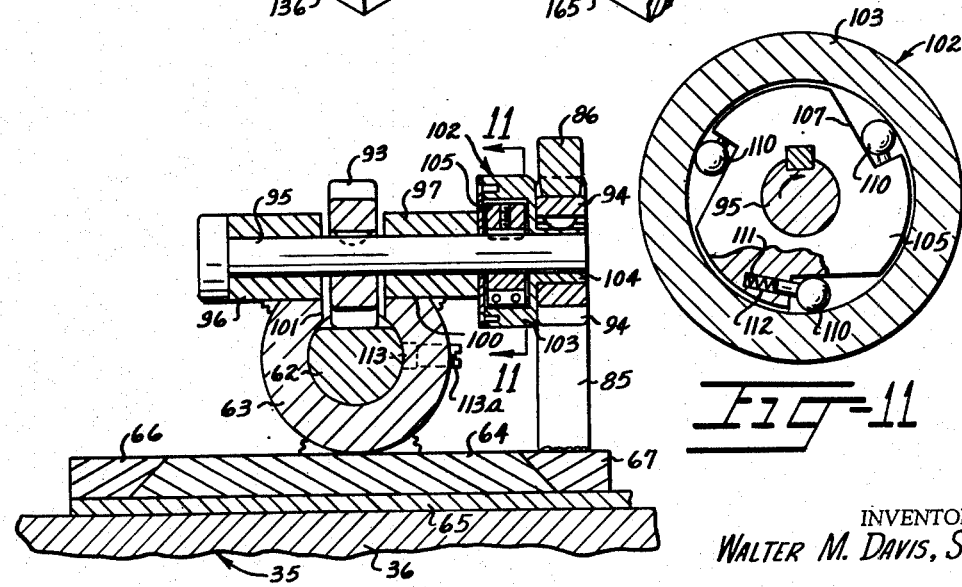
INVENTOR:
WALTER M. DAVIS, SR.
BY Eaton + Bell
ATTORNEYS.

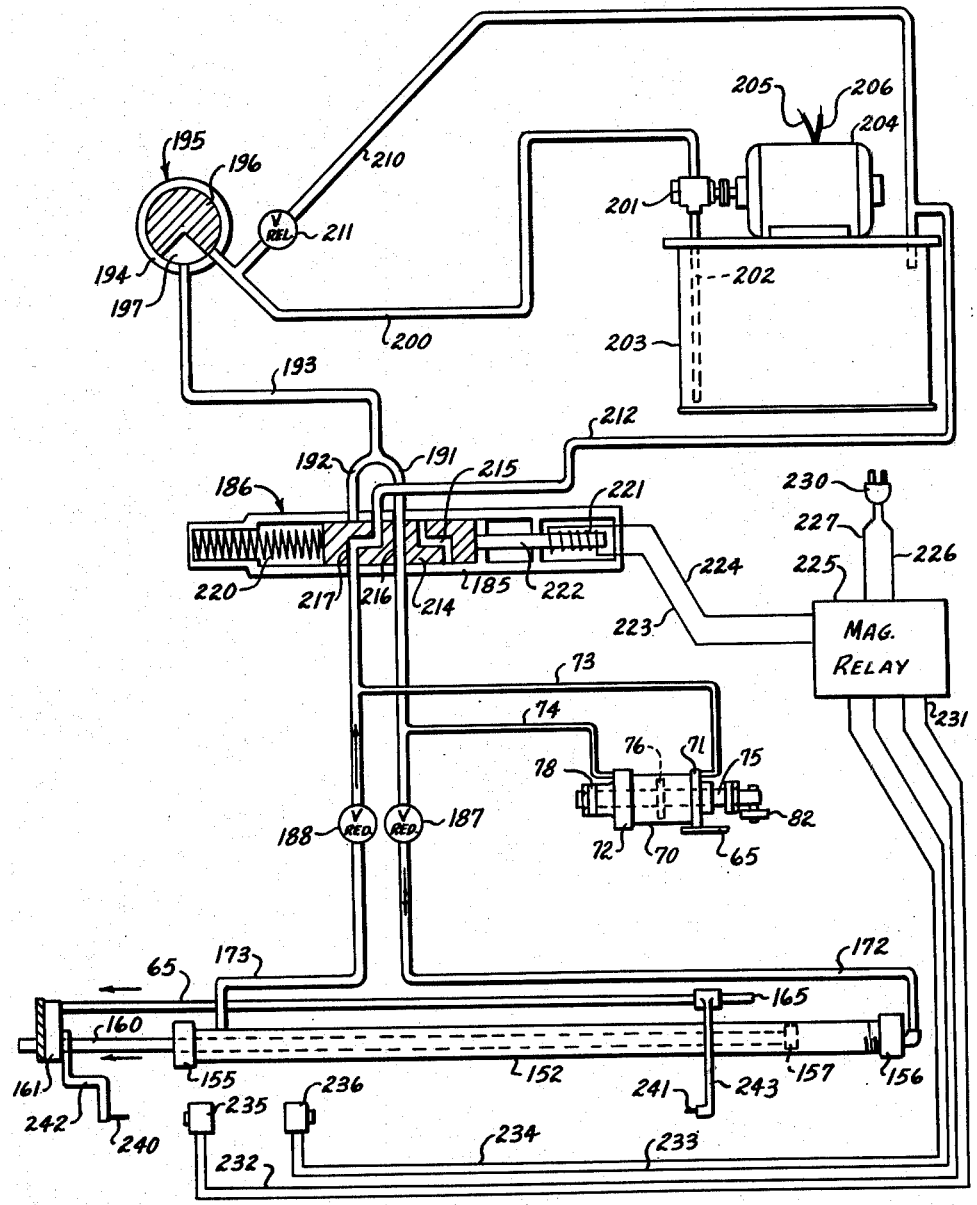

Patented May 11, 1954

2,678,070

UNITED STATES PATENT OFFICE 2,678,070

AUTOMATIC CURVE CUTTING SAWING APPARATUS

Walter M. Davis, Sr., Lenoir, N. C.

Application July 28, 1952, Serial No. 301,293

5 Claims. (Cl. 143—26)

This invention relates to woodworking and woodcutting machinery and more especially to an apparatus adapted for use with a bandsaw machine, scroll cutting machine or the like for successively automatically cutting irregularly shaped pieces or articles from a workpiece and automatically varying the position of the workpiece relative to the cutting blade according to a predetermined pattern.

Heretofore, in order to cut a plurality of identical pieces or articles from a common workpiece on a bandsaw machine or the like, many manual operations have been required. In some instances, it has been necessary to mark out the shape of each individual piece or article to be cut from a workpiece and to use this outline as a guide in cutting each piece from the workpiece. In other instances, a movable base or platform has been provided on which a workpiece was adjustably secured and which platform, with the workpiece thereon, would be moved manually past the cutter blade with pattern means being provided to assist the operator in guiding the pattern and the workpiece past the cutter blade. Upon each individual article or piece being cut from the workpiece, it was also necessary for the operator to adjust the workpiece relative to the base or platform for each successive cutting operation.

It is the primary object of this invention to overcome such defects as above mentioned by providing a platform adapted to rest upon the usual bandsaw machine table and on which a workpiece in the form of a block of wood or other material may be positioned and wherein means are provided for automatically reciprocating the platform and the workpiece simultaneously past the cutting blade while simultaneously and automatically moving the workpiece and the platform in unison relative to the cutting blade or saw according to a predetermined pattern and, further, upon each successive piece or article being cut from the workpiece, automatic advancing or feeding means moves the workpiece toward the saw or cutting blade relative to the platform a predetermined distance according to the desired thickness of each successive piece to be cut from the workpiece, whereby a plurality of individual pieces or articles of predetermined configuration may be automatically cut or severed from a common workpiece in succession obviating the necessity of performing any manual operations other than placing the workpiece upon the said platform and securing the workpiece to the feeding means.

More specifically, it is an object of this invention to provide apparatus for use in conjunction with a conventional bandsaw machine including a planar platform or workpiece support having one of its edges cut away in substantially the shape of the pieces to be cut from the workpiece and upon which the workpiece is positioned. An elongated pattern element is mounted beneath the table and is provided with a groove therein shaped according to a predetermined pattern, and the bottom of the platform, resting upon the table of the machine, also has an elongated substantially straight groove in the lower surface thereof, there being a connection between the groove in the pattern element and the groove in the bottom of the platform. Means are provided for automatically reciprocating the platform and the pattern element relative to each other and relative to the bandsaw blade whereby, upon movement of the workpiece on the platform towards the cutting edge of the bandsaw, the grooved pattern element causes the platform to move in a circuitous or irregular path according to the curvature or shape of the pattern groove in the pattern element. At the end of each stroke of the platform, means are provided to automatically move the workpiece on the platform away from the cutting blade whereupon means automatically cause the platform to reverse its direction of movement to return the same to its original position.

Each time the platform returns to its original position, automatically operable means cause the workpiece to be advanced relative to the platform according to the thickness of each successive article or piece to be cut from the workpiece and whereupon another active stroke of the platform with the workpiece thereon is effected.

Some of the objects of the invention having been stated, other objects will appear as the description proceeds, when taken in connection with the accompanying drawings, in which—

Figure 1 is a side elevation of the improved apparatus showing the same in association with a bandsaw machine, the upper portion of which is broken away;

Figure 2 is a front elevation of the improved apparatus looking at the left-hand side of Figure 1 but omitting the upper portion of the bandsaw machine;

Figure 3 is a top plan view of the improved apparatus showing the same in association with the table and cutting blade of a bandsaw machine;

Figure 4 is a view similar to Figure 3, but showing the workpiece, the movable platform and the interconnected parts in a different position than that in which they are shown in Figure 3;

Figure 5 is an enlarged fragmentary vertical sectional view taken substantially along the line 5—5 in Figure 2, showing particularly the means for imparting movement to the movable platform and the pattern element;

Figure 6 is an enlarged detail looking substantially along the line 6—6 in Figure 3, with parts in section, showing the means for advancing the workpiece transversely of the cutting edge of the bandsaw cutting blade in a step-by-step manner preparatory to cutting or severing each successive article or piece from the workpiece;

Figure 7 is an inverted plan view of the workpiece support or platform disassociated from the rest of the machine, but showing the relative position of the cutting blade and looking up substantially along the line 7—7 in Figure 2;

Figure 8 is a top plan view of the pattern form or cam plate with parts in section, taken substantially along the line 8—8 in Figure 2;

Figure 9 is an enlarged fragmentary isometric view with parts in section and parts broken away showing some of the intervening connections for effecting reciprocatory movement of the pattern element or cam plate and the workpiece support or platform;

Figure 10 is an enlarged fragmentary vertical sectional view taken substantially along the line 10—10 in Figure 6;

Figure 11 is a fragmentary vertical sectional view taken substantially along the line 11—11 in Figure 10, showing the overriding clutch mechanism associated with the means for advancing the workpiece relative to the workpiece support or platform;

Figure 12 is a schematic illustration of the hydraulic and electrical connections for effecting operation of the various movable elements of the machine in proper sequence.

Referring more specifically to the drawings, the numeral 10 broadly designates a hollow frame 10 of a bandsaw machine or the like and which includes a lower wheel housing 11 adapted to rest upon a floor F and which supports a conventional bandsaw table or platform 12. An extension 13 rises upwardly from the rear of the housing 11 and has an arm 14 suitably secured thereto which rotatably supports an upper wheel or pulley 15. A lower wheel or pulley 16 is supported for rotation in the lower housing 11.

The pulleys 15 and 16 support a bandsaw or endless cutter blade 17 which extends through a suitable guide mechanism broadly designated at 20 and supported by the free end of the arm 14. The bandsaw or endless cutter blade 17 also extends through a suitable slot or opening 21 (Figure 5) in the table or platform 12 and through suitable guide means 22 disposed beneath the opening 21 in the table 12. The lower wheel 16 is driven by means of a sprocket wheel 23 which is engaged by a sprocket chain 24. The sprocket chain 24 is also mounted on a sprocket wheel 25 fixed on a motor shaft 26 extending from an electric motor shaft 26 extending from an electric motor 27 (Figure 2).

The electric motor 27 has suitable wires 30 and 31 extending therefrom to a suitable source of electrical energy, not shown. The bandsaw machine is of conventional construction and a further description thereof is therefore deemed unnecessary.

It is with a machine of the character described that the present invention is particularly adapted to be associated. However, it is to be understood that the present invention may also be used in association with jig saw machines, routing machines and other analogous scroll cutting machinery.

The improved apparatus comprises an auxiliary table broadly designated at 35 which includes a relatively thin table top 36, preferably of sheet metal, which is substantially rectangular in shape, but is cut away to fit around the conventional bandsaw machine table 12 and is supported at the same level as the conventional bandsaw machine table 12 by means to be presently described. The plate or auxiliary table top 36 is suitably secured to the upper surfaces of front and intermediate transverse frame members 37 and 38, shown in the form of channel bars in Figure 5, which are connected at opposite ends thereof to frame members 41 and 42.

The frame members 41 and 42 extend rearwardly from the frame member 37 and the rear portion of each of the frame members 41 and 42 is cut away as at 43 (Figure 1). The rear ends of the frame members 41 and 42 are connected to the outer ends of respective transverse frame members 44 and 45 (Figures 1 and 3). The proximal ends of the transverse frame members 44 and 45 terminate closely adjacent opposite sides of the conventional table top 12. The framework formed from the channel bars or frame members 37, 38 and 41 to 45, inclusive, is supported on a pair of front legs 46 and 47 and a pair of rear legs 50 and 51.

The rear legs 50 and 51 are preferably formed as shown in Figure 1 so the lower ends thereof are disposed forwardly of the vertical plane of the rear edge of the table top 36 so the auxiliary table 35 does not take up any more floor space than is necessary.

It will be noted in Figure 3 that the opening 21 through which the cutter blade or bandsaw 17 extends is in the form of a slot which extends to one edge of the conventional table top 12 and which is provided to facilitate mounting the cutting blade or bandsaw 17 on the wheels or pulleys 15 and 16. Therefore, the auxiliary table top 36 is cut away, as at 52, so the cutting blade 17 may be moved forwardly or rearwardly between the auxiliary table top 36 and the conventional table top 12 for installation purposes.

Now, a workpiece support, broadly designated at 55, in the form of a platform or plate, rests upon the auxiliary table top 36 and a workpiece W rests upon the platform 55. This workpiece may be in the form of a solid block as shown in Figure 5 or may be laminated as shown in Figures 1 and 2 and may be of any desired workable material such as lumber, sheet metal, cardboard, leather, composition material and the like. The rear edge of the platform or workpiece support 55 is provided with an irregular surface 56 which is shown as being serpentine in this instance and, in order to automatically advance the workpiece W beyond this irregular surface 56 following each cutting operation, the workpiece W is secured to a vertically disposed plate 57, as by screws 60 (Figure 3). The plate 57 is a part of a workpiece feeding apparatus broadly designated at 61, which also includes a plunger in the form of a rack 62, to the rear end of which the plate 57 is suitably secured. The rack 62 is mounted for longitudinal sliding movement in an elongated tubular guide member 63 (Figure 10) suitably secured, as by welding, to the upper surface of a dovetailed slide or guide plate 64.

The dovetailed slide or guide plate 64 is mounted for longitudinal sliding movement on a feed mechanism base plate 65 and between guide ways or gibs 66 and 67 as best illustrated in Figure 10. It will be observed in Figure 3 that the feed mechanism base plate 65 is substantially larger than the dovetailed slide or guide plate 64 and is suitably secured to the upper surface of the workpiece support platform 55.

In order to effect reciprocatory movement to the dovetailed slide 64 and the tubular guide member 63, a horizontally disposed ram is provided which comprises a hydraulic or pneumatic cylinder 70, opposite ends of which are closed by a cylinder head 71 and a cylinder base 72 (Figure 6). The cylinder head 71 is suitably secured, as by welding, to the feed mechanism base plate 65. Flexible pipes or conduits 73 and 74 are connected to the cylinder head 71 and cylinder base 72 respectively for communication with the interior of the cylinder 70. Mounted for longitudinal sliding movement in the cylinder head 71 and the cylinder base is a piston rod 75, the medial portion of which has a piston 76 fixed thereon mounted for longitudinal sliding movement in the cylinder 70.

In order to adjust the length of stroke of the piston rod 75 in opposite directions, opposite ends of the piston rod 75 have washers 77 and 78 mounted thereon (Figure 6), the outer surfaces of which bear against respective adjustment nuts 80 and 81 threadably mounted on opposite ends of the piston rod 75. Thus, upon an active stroke of the piston rod 75, the washer 78 engages the outer or front end of the cylinder base 72 and, upon an inactive or forward stroke of the piston rod 75, the washer 77 engages the cylinder head 71.

The rear end of the piston rod 75; that is, the end of the piston rod 75 nearest the endless cutter blade or bandsaw 17, is connected to a plate or bar 82 by means of a screw 83. It will be observed in Figure 3 that this bar 82 extends to the left from the screw 83, beneath the rack 62 and is suitably secured to the upper surface of the dovetailed slide or guide plate 64, as by welding (see also Figure 6).

Spaced rearwardly from the cylinder 70, and being suitably secured to the upper surface of the guideway or gib 67, as shown in Figure 10, is a post 85, in the bifurcated upper end of which a latch means in the form of a relatively short rack 86 is mounted. In this instance, the rack 86 is mounted for pivotal movement about a fixed pivot pin 87 (Figure 6) carried by the post 85 and a removable locking pin 90 also slidably penetrates the post 85 and the rack 86 to maintain the rack 86 in a fixed horizontal position. The purpose of the removable pin 90 is to permit the rack 86 to be pivoted about the pin 87 when an operator desires to move the plunger 62 forwardly or rearwardly independently of the cylinder 70 or the piston rod 75 as would be necessary in replacing the workpiece W on the workpiece support or platform 55.

The rack or plunger 62 engages the lower portion of a pinion 93 (Figure 10) and the rack 86 engages the upper portion of a pinion 94. The pinion 93 is keyed or otherwise secured to a transverse shaft 95 rotatably mounted in bearing blocks 96 and 97. The upper portion of the tubular guide member 63 is provided with an arcuate transverse groove 100 therein in which the bearing blocks 96 and 97 are disposed, these bearing blocks being suitably secured to the tubular guide member 63, as by welding. The tubular guide member 63 also has a relatively short longitudinally extending slot 101 therein through which the gear or pinion 93 extends for engagement with the rack 62.

The pinion 94 forms a part of a racking mechanism shown in the form of an overriding clutch mechanism broadly designated at 102 (Figure 11) and which includes a housing 103 having a reduced portion 104 (Figure 10) integral therewith to which the pinion 94 is suitably keyed or otherwise secured. The reduced portion 104 of the circular housing 103 is slidably mounted on the shaft 95 in order to permit relative rotational movement between the housing 103 and the shaft 95. Disposed within the housing 103 is a clutch element or rotor 105 which is keyed or otherwise fixed on the shaft 95 and which is provided with a plurality of notches 107 in the periphery thereof.

Each of the notches 107 is substantially triangularly shaped and has a pair of relatively small balls 110 mounted therein, which balls are normally urged outwardly by compression springs 111 disposed in suitable bores 112 in the rotor 105. Thus, upon rotation of the housing 103 in a counter-clockwise direction in Figure 11, relative to the rotor 105, the balls will move towards the small ends of the grooves or notches 107, as defined by the junctures of inner periphery of the housing 103 and the bottoms of the notches 107, and will thereby cause like rotation to be imparted to the rotor 105, the shaft 95 and the gear 93.

On the other hand, upon relative movement between the rotor 105 and the housing 103 in the opposite direction; that is, upon rotation of the rotor 105 in a counter-clockwise direction relative to the housing 103, the housing 103 may remain stationary since the balls 110 will tend to move towards the large ends of the notches 107. It is thus seen that, upon each active or rearward stroke of the piston rod 75, the tubular guide member 63, shaft 95, pinions 93 and 94 and the overriding clutch mechanism 102 will also move rearwardly therewith. Since the track 86 remains stationary, the pinion 94 is caused to rotate in engagement with the rack 86 in a counter-clockwise direction in Figure 6.

It is obvious that this will cause the housing 103 of the overriding clutch mechanism 102 to also rotate in a counter-clockwise direction in Figure 11 which will, in turn, cause the shaft 95 and the pinion 93 to rotate in the same direction thereby causing the plunger or rack 62 to move rearwardly relative to the tubular guide member to feed the workpiece toward the endless cutter blade or bandsaw 17 a predetermined distance. Of course, during a return stroke of the piston rod 75 and the associated parts, including the shaft 95, the pinion 94 will be caused to rotate in a clockwise direction in Figure 6 and the pinion 93 and shaft 95 are thereby permitted to rotate therewith in the opposite direction so the plunger or rack 62 may remain stationary, due to the relative movement between the rotor 105 and the housing 103 of the overriding clutch mechanism 102.

Now, assuming that the thickness of each article A (Figures 3, 4 and 5) to be cut from the workpiece W is to be three-fourths of an inch thick, the diameters of the gears 93 and 94 are such that the rack 62 moves twice as far with each active stroke of the piston rod 75 as the piston rod 75, the dove-tailed plate 64 and the tubular guide member 63. In other words, the piston rod 75, the dove-tailed plate 64 and the tubular guide member 63 move three-quarters of an inch relative to the cylinder 70 and the workpiece support 55, while the rack 62 moves twice as far or one and one-half inches relative to the workpiece support 55 to thereby advance the workpiece a total of one and one-half inches upon the termination of each inactive stroke of the workpiece support 55.

On the other hand, upon the termination of each active stroke of the workpiece support 55, in cutting an article A from the workpiece W, the piston rod 75 moves forwardly and the length of the return stroke of the piston rod 75 is identical to the length of the active stroke thereof or three-quarters of an inch, in this instance. Thus, upon each inactive or return stroke of the piston rod 75, the dove-tailed plate 64 and the tubular guide member 63 will also return an equal distance therewith or three-fourths of an inch.

Now, referring to Figures 6 and 10, it will be observed that a friction element 113 is mounted for radial adjustment in one side of the tubular guide member 63. This friction element 113, which is preferably made from a semi-hard rubber or a fibrous material such as leather, felt and the like, is held in frictional engagement with one side of the plunger or rack 62 by an adjustment screw 113a. Hence, with each inactive stroke of the piston rod 75, the rack or plunger 62 is caused to move forwardly, away from the bandsaw blade 17, with the tubular guide member 63. Of course, upon each active stroke of the piston rod 75, it is evident that the gears 93 and 94 will overcome the frictional resistance of the friction element 113 and will thereby advance the rack or plunger 62 relative to the tubular guide member 63.

It is thus seen that, upon each article A being severed from the workpiece W, the workpiece is moved forwardly away from the endless cutter blade a predetermined distance so that it does not engage or rub against the cutter blade 17 during the inactive stroke of the workpiece support 55. Then, the workpiece is advanced twice the distance that it was previously withdrawn from the cutter blade 17 preparatory to a succeeding article A being severed from the workpiece W of exactly the same thickness as the article A previously severed from the workpiece W, in the course of each successive active stroke of the workpiece support 55.

A means for controlling the flow of fluid under pressure to opposite ends of the cylinder 70 in proper timed relation to movement of the workpiece support or platform 55 will be later described.

In order to prevent sidewise movement of the workpiece W under pressure of the cutter blade 17 during a cutting operation, a forwardly and rearwardly extending guide element or bar 114 (Figures 2 and 3) is suitably secured to the upper surface of the workpiece support or platform 55 against which the corresponding edge of the workpiece W has sliding movement as it is intermittently fed towards the irregular edge 56 of the workpiece support or platform 55 by the workpiece feeding mechanism 61.

*Pattern mechanism*

Referring particularly to Figure 7, it will be observed that the lower surface of the workpiece support 55 has a pair of spaced substantially parallel irregular grooves 120 and 121 therein, the first groove 120 preferably being narrower than the second groove 121 and both of these grooves being formed substantially parallel to the configuration of the irregular surface 66 of the workpiece support 55. Of course, these grooves 120 and 121 must extend in exact parallel relation to the shape of the articles A to be cut from the workpiece W.

The lower surface of the workpiece support 55 also has an elongated groove 122 in the lower surface thereof which preferably extends from one end of the workpiece support 55 to the other in substantially parallel relation to the optimum direction of movement of the workpiece support 55 as it moves past the cutter blade 17. This groove 122 preferably extends at a slight angle relative to the optimum direction of movement of the workpiece support 55 past the cutting blade 17 in order that a minimum amount of space is required for the pattern form or cam plate to be presently described.

A fixed guide roller or follower 123 (Figures 3 and 4) is disposed immediately forwardly of the cutting edge of the cutter blade or bandsaw 17 and the walls of the groove 120 are adapted to engage this fixed guide roller 123. The guide roller 123 is carried by and projects upwardly from the conventional table top 12. One of the walls of the groove 121 has a plurality of projections thereon which, in this instance, are formed by a link chain 124 suitably secured against the rear wall of the groove 121. The link chain 124 is engaged by a sprocket wheel 125 disposed within the groove 121, which sprocket wheel is fixed on a vertically disposed shaft 126 (Figure 5).

It will be observed in Figure 5 that the conventional table top 12 is provided with an opening 130 through which the shaft 126 loosely extends into a tubular extension 131 (Figures 5 and 9). Projections or pins 132 extending outwardly from the shaft 126 and fit in corresponding slots 133 in the upper end of the tubular extension 131 to thereby facilitate lifting the sprocket wheel 125 and the shaft 126 out of engagement with the tubular extension 131. The tubular extension 131 is fixed, as by welding, to a vertically disposed shaft 134, the medial portion of which is rotatably mounted in a gear housing 135 suitably secured to the upper surface of a forwardly and rearwardly extending support plate 136.

It will also be observed in Figure 5 that the lower end of the shaft 134 is rotatably mounted in the horizontally disposed support plate 136 and is prevented from moving vertically by a pinion 137 fixed on the shaft 134 within the gear housing 135. The lower end of the pinion 137 has sliding rotational movement against the upper surface of the plate 136 and the upper end of the pinion 137 has sliding rotational movement against the upper wall of the housing 135.

The support plate 136 depends from the conventional table top 12 and is spaced therebeneath by hanger members or frame members 140 to 142, inclusive, suitably secured at their lower ends to the support plate 136 and being suitably secured at their upper ends to the lower surface of the conventional table top 12. Spaced between the lower surface of the conventional table top 12 and the upper surface of the support plate 136 is a pattern form guide element shown in the form of a channel bar 145 (shown in dash-and-dot lines in Figure 9) which is relatively short and supported at one edge thereof by the hanger element or support 142 and being suitably supported at the other edge thereof by the hanger elements or frame members 140 and 141.

An elongated flat pattern form or cam plate 146 is mounted for longitudinal sliding movement in the guide element or channel bar 145 and is retained thereon by angle clips 147 carried by the flanges of the channel bar 145 and by a shoulder 150 formed on the support 142. The pattern form or cam plate 146 is substantially rectangular in plan and in cross section and the upper surface thereof is provided with a cam groove or pattern groove 151 of irregular configuration which extends generally longitudinally of the pattern form or cam plate 146. This cam groove or pattern groove 151 is shaped to conform to the varying angles that the workpiece support or platform 55 must be positioned in order that the constantly moving and varying points of tangency of the irregular edge 56 of the workpiece support or platform 55 move parallel to the cutting edge of the cutter blade 17.

*Driving means for pattern mechanism*

Now, in order to effect movement of the workpiece support 55 in one direction while moving the pattern form or cam plate 146 in the opposite direction a relatively long pneumatic or hydraulic cylinder 152 is adjustably secured to the lower surface of the support plate 136 by means of a split bracket 153 welded to the lower surface of the support plate 136 and which is clamped about the left-hand portion of the cylinder 152 in Figure 2 by suitable bolts 154. Opposite ends of the cylinder 152 are closed by cylinder head 155 and a cylinder base 156. A piston 157 is mounted for longitudinal sliding movement in the cylinder 152 and a piston rod, connected to the piston 157, slidably penetrates the cylinder head 155 and the outer end or left-hand end thereof in Figure 2 is suitably secured to a block 161 (Figures 2 and 12).

The block 161 is fixed to a bracket 162 which extends upwardly in Figure 2 and suitably secured to the lower surface of the pattern form or cam plate 146. Also, suitably secured to the block 161 is one end of a rack 165 (Figure 9) which extends in parallel relation above the cylinder 152. The rack 165 is supported for longitudinal sliding movement upon the support plate 136 and is held in engagement with a gear 166 by a guide bar 167 (Figures 5 and 9) suitably secured, as by welding, to the hangers or frame members 140 and 141.

The gear 166 is fixed to the lower surface of a relatively larger gear 170, the hub of which gear 166 rotates in sliding engagement with the upper surface of the support plate 136. The gear 170 is rotatably mounted on a stub shaft in the form of a shoulder screw 171 threadably embedded in the support plate 136. The relatively large gear 170 meshes with the pinion 137 heretofore described.

The cylinder base 156 has one end of a conduit or pipe 172 connected thereto and one end of a pipe or conduit 173 is connected to the cylinder 152 adjacent the cylinder head 155 (Figure 12). A means is provided, to be presently described, for alternately directing fluid under pressure through the pipes or conduits 172 and 173. It is thus seen that, upon fluid under pressure being alternately directed to opposite ends of the cylinder 152, the rack 165 and the pattern form or cam plate 146 reciprocate in unison. It is evident that reciprocation of the rack 165 causes oscillation of the sprocket wheel 125 through the intervening gears 166, 170 and 137 and, since the sprocket wheel 125 meshes with the sprocket chain 124 in the groove 121 workpiece support 55, this causes the workpiece support to reciprocate and, in so doing, to move in a direction opposite from the direction of movement of the pattern form or cam plate 146.

Now, in order to cause the workpiece support 55 and the workpiece W to move along an irregular path of predetermined configuration upon each reciprocation thereof, a lever arm 175, which may also be termed a stylus, is oscillatably mounted, as at 176, on the lower surface of the conventional table 12, immediately above the pattern form or cam plate 146, as is most clearly shown in Figure 5. One end of the lever arm 175 has a downwardly extending stub shaft 177 fixed thereto and the other end thereof has an upwardly extending stub shaft 180 fixed thereto (Figures 5 and 2, respectively).

The stub shafts 177 and 180 have respective rollers or followers 181 and 182 mounted thereon. The follower 181 engages the cam or pattern groove 151 in the upper surface of the pattern form or cam plate 146 (Figures 3, 4 and 8). The auxiliary table top 36 is provided with an arcuate slot 183 (Figure 3) through which the stub shaft 180 loosely extends and the follower or roller 182 on the upper end of the stub shaft 180 engages the elongated groove 122 in the lower surface of the workpiece support 55, as is most clearly shown in Figure 7. It is evident that the slot 183 in the auxiliary table top 36 is shaped to conform to the path of travel of the stub shaft 180 about the pivot point 176 of the lever arm 175.

It is thus seen that, as the workpiece support 55 moves in one direction, say, from left to right in Figures 3 and 4, and as the pattern form or cam plate 146 moves in the opposite direction, the cam groove or pattern groove 151 in the pattern form or cam plate 146 causes relative movement between the cam plate 146 and the lever arm 175, since the roller or follower 181 will follow the cam groove 151 and thus be swung about the pivot point 176 of the lever arm 175 according to the shape of the cam groove 151.

It is evident that this will cause the follower 182 to also swing about the pivot point 176 of the lever arm 175 to thereby swing the workpiece support or platform 55 in opposite directions about the follower wheel 123 (Figure 7) so the cutting blade 17 will cut an article A from the workpiece W shaped to conform to the groove 151 in the pattern form 146 and conforming to the shape of the surface 56 on the workpiece support 55.

*Piping and wiring diagram*

Referring to Figures 1 and 12, it will be observed that the pipes or conduits 172 and 173 extend from the cylinder 152 to a housing 185 of a solenoid operated valve broadly designated at 186. The ends of the flexible pipes or conduits 73 and 74 remote from the cylinder 70 are connected to the respective pipes 172 and 173. Interposed in the pipes 172 and 173 at points between the cylinder 152 and the pipes or conduits 73 and 74 are reducing valves 187 and 188.

Alined with the pipes 172 and 173 and penetrating the opposite side of the housing 185 from that penetrated by the pipes 172 and 173 are branch pipes 191 and 192, respectively, which are connected to a common pipe or conduit 193. The end of the pipe or conduit 193 remote from the branch pipes 191 and 192 penetrates a housing 194 of a manually operable regulator valve 195. This regulator valve 195 may be of any desired or conventional construction and is preferably of the type manufactured by Vickers, Detroit, Michigan, under their Model No. S-206-AC and under United States Patent Number 2,102,865.

The regulator valve 195 has a manually movable core 196 therein which is provided with a passageway or chamber 197 for establishing communication between the pipe 193 and a pipe 200 which also penetrates the housing 194. The end of the pipe 200 remote from the regulator valve 195 is connected to a hydraulic pump 201 having a pipe 202 extending therefrom into a suitable reservoir 203. An electric motor 204 is supported by the reservoir 203 and has wires 205 and 206 extending therefrom, to a suitable source of electrical energy not shown.

The motor 204 is coupled to the hydraulic pump 201 to cause fluid under pressure to flow from the reservoir 203 through the pipe 200 to the regulator valve 195. Since the electric motor 204 drives the pump 201 continuously, a pipe 210 is connected at one end thereof to the pipe 200 and has a pressure relief valve 211 interposed therein. The other end of the pipe 210 extends into the reservoir 203. Thus, when the manually operable regulator valve 195 is closed, as shown in Figure 12, the pressure relief valve 211 permits the fluid from the pipe 200 to return to the reservoir 203 through the pipe 210.

A return pipe or conduit 212 is also connected to and penetrates the housing 185 of the solenoid valve 186 at one end thereof, the other end thereof being connected intermediate the ends of pipe 210. The solenoid valve 186 may be of any desired construction and is shown schematically in Figure 12 merely to illustrate the cycle of operation of the machine.

The housing 185 of the solenoid valve 186 has a longitudinally movable core 214 mounted therein which is provided with passageways 215, 216 and 217. The core 214 is normally urged towards the right in Figure 12 by a compression spring 220 and may be moved towards the left in Figure 12 by means of a solenoid coil 221 which surrounds a solenoid core or extension 222 extending from the right-hand end of the core 214. The solenoid coil 221 has wires 223 and 224 connected to opposite sides thereof, the other ends of which are connected to a magnetic relay 225 which is conventional and a detailed description and illustration of which is thus deemed unnecessary.

A magnetic starter of the type manufactured by General Electric Company, Schenectady, New York and such as is illustrated in Sweet's File for Product Designers, section 3a/8, page 34, may serve in the capacity of the magnetic relay 225. Since the magnetic relay 225 is usual construction, no attempt will be made herein to describe the manner in which the various wires or conductors are connected to the same, the magnetic relay merely being shown schematically in Figure 12.

The magnetic relay 225 has lead wires 226 and 227 extending therefrom to opposite sides of a plug 230 adapted to be connected to a suitable source of electrical energy, not shown. The magnetic relay also has wires 231 to 234, inclusive, extending therefrom. The wires 231 and 232 are connected to opposite sides of a momentary-contact stop switch 235 and the wires 233 and 234 are connected to opposite sides of a momentary- contact start switch 236. The switches 235 and 236 are of the push-button type and are suitably secured to corresponding brackets 237 (Figures 1, 2 and 5) suitably secured to and depending from the lower surface of the support plate 136.

Switch actuating elements in the form of pins 240 and 241 are disposed in alinement with, and are adapted to alternately engage, the push-buttons of the respective stop and start switches 235 and 236. The switch actuating element 240 is fixed to a substantially Z-shaped bracket 242 which is suitably secured to the block 161 to which the free end of the piston rod 160 is connected. The switch actuating element 241 is fixed to one end of an arm or bracket 243 which extends inwardly and upwardly above the cylinder 152 (Figures 1, 2 and 12) and is suitably secured to the rack 165.

*Method of operation*

Obviously, the first step in operation of this apparatus is to form the surface 56 and the grooves 120 and 121 in the lower surface of the workpiece 55 in substantially the shape of the articles A to be cut from the workpiece W. In order to determine the exact shape of the irregular groove 151 in the cam plate or pattern form 146, a lead pencil may be substituted for the roller 181 or the roller 181 and the stub shaft 177 carried by the lever arm or stylus 175, the lead pencil being so positioned that it engages the upper surface of the pattern form or cam plate 146. The operator then positions the workpiece support 55 upon the table, aligning one or the other of the open ends of the groove 121 with the sprocket wheel 125 and then slides the workpiece support 55 along the table 35 so the vertical walls of the groove 121 straddle the sprocket wheel 125 and so that the vertical walls of the groove 120 straddle the roller or follower 123.

The operator then moves the workpiece support or platform 55 along the upper surface of the table 35 and the conventional table 12 with the surface 56 adjacent the cutter blade 17 and with the rollers or followers 123 and 182 disposed in the respective grooves 120 and 122 formed in the bottom of the workpiece support or platform 55. Thus, as the operator moves the workpiece support 55 from left to right across the auxiliary table 35 and oscillates the same about the roller or follower 123 so that the cutting edge of the cutter blade 17 is tangent to the surface 56 at all times, this causes the lever arm or stylus 175 to oscillate about its pivot point 176 to, in turn, cause the pencil or other marking device supplemented for the roller 181 to form a curved or irregular line on the upper surface of the pattern form or cam plate 146.

The pattern form or cam plate 146 is then removed from the machine and the line formed thereon in the manner heretofore described is used as a guide in cutting the cam groove or pattern groove 151 in the pattern form or cam plate 146. The roller or follower 181 is then reinstalled on the lever 175 and the pattern form or cam plate 146 is then re-installed in the machine with the left-hand end thereof in Figure 2 secured to the bracket 162. Thereafter, a workpiece W is placed upon the table and fastened to the plate 57 of the workpiece feeding mechanism 61, whereupon the plunger or rack 62 is manually positioned so that the rear edge of the workpiece W extends beyond the surface 56 of the workpiece support 55 the desired distance to subsequently cut an article A of the desired thickness from the workpiece W.

In order to enable the operator to move the rack 62 freely in either direction, the pin 87 may be moved out of engagement with the rack 86 and the rack 86 may be swung upwardly out of engagement with the corresponding pinion or gear 94 so that the shaft 95 and the gears 93 and 94 may rotate freely without moving the piston rod 75 and intervening connections.

Also, in order to enable the operator to move the rack 62 freely in the tubular guide member 63, the operator may loosen the screw 113a to thus relieve the pressure of the friction element 113 against the rack 62. Of course, the rack 86 is again lowered and the pin 87 re-installed after the workpiece has been properly positioned the operator 30 and, also, the operator may again tighten the lock screw 113a to again cause the friction element 113 to frictionally engage the rack or plunger 62.

The apparatus is then ready for automatic operation to successively sever articles A of identical configuration and thickness from the workpiece W. Since the cylinder 70 is fixed to move with the platform or workpiece support 55, it is preferable that the conduits 73 and 74 extending therefrom be flexible. However, the remaining pipes or conduits illustrated in Figure 12 may be of rigid construction, if desired.

In operation it is to be assumed that the workpiece support 55 is positioned so that the workpiece W is disposed to the left of or adjacent the cutting edge of the cutter blade 17 or, in other words, somewhat to the left of that shown in Figure 3 relative to the cutter blade 17. The switch actuating element 240 would then be in engagement with the plunger or push button of the stop switch 235, thereby causing de-energization of the solenoid coil 221 in the solenoid valve 186 (Figure 12). This causes the core 214 to assume the position shown in Figure 12.

The operator then rotates the core 196 of the manually operable regulator valve 195 a desired amount in a counterclockwise direction in Figure 12 to establish communication between the pipes 200 and 193. This permits fluid to flow under pressure from the reservoir 203 through the pump 201, through pipe 200, through pipe 193 and through the branch pipe 191, to the solenoid valve 186. Since the passageway 216 is then positioned in alinement with branch pipe 191 and pipe 172, fluid under pressure would continue through passageway 216, through the pipe 172 and through the pipe 74 to the cylinder 70, since the reducing valve 187 will retard the flow of the fluid under pressure and will cause the fluid under pressure to enter the pipe 74 before it continues through the pipe 172 to the cylinder base 156.

Thus, upon fluid entering the front end of the cylinder 70, the piston 76 and piston rod 75 move rearwardly or from left to right in Figure 6 to thereby impart movement to the tubular guide member 63 and to cause rack 62 to advance twice as far as said rack 62, in the manner heretofore described, for feeding the workpiece W past the surface 56 of the workpiece support 55 a predetermined distance. As the piston 76 approaches the end of its active stroke, as limited by the washer 78 in Figure 6, the pressure builds up back of the reducing valve 187 and then passes through the valve 187 and into the right-hand end of the cylinder 152. This causes the piston 157 and piston rod 160 to move from right to left in Figures 2 and 12, to, in turn, move the rack 165 and the pattern form or cam plate 146 from right to left in Figures 2, 3, 4 and 12.

However, due to the gears 166, 170 and 137, the sprocket wheel 125 rotates in engagement with the sprocket chain 124 thereby causing the workpiece support 55 to move from left to right in Figures 2, 3 and 4, or in the opposite direction from that in which the rack 165 and the pattern form 146 are moved. As the workpiece support 55 moves from left to right, it is evident that the lever arm or stylus 175 will oscillate about its pivot point 176 due to the groove 151 in the pattern form or cam plate 146 moving past the follower or roller 181. Thus, the cutter blade 17 will sever an article A from the workpiece W conforming substantially to the shape of the irregular groove 120 in the bottom of the workpiece support 55 as the workpiece support 55 is pivoted about the roller or follower 123 by the follower 182 riding in the groove 122.

It is evident that, during the active stroke of the workpiece support 55, the fluid returns from the left-hand end of the cylinder 152 through the pipe 173, passageway 217 in the core 214 of the solenoid valve 186, pipe 212 and pipe 210 to the reservoir 203. Upon the workpiece support 55 reaching the end of its active stroke, the switch actuating element 241 engages the start switch 236 which, in turn, energizes the solenoid coil 221 and causes the core 214 in the solenoid valve 186 (Figure 12) to move from right to left until the passageway 216 is alined with the branch pipe 192 and the pipe 173.

Now, when the passageway 216 is alined with the pipe 192, fluid under pressure flows from the branch pipe 192 through the passageway 216 and the pipe 173 to the pipe 73, since the reducing valve 188 will momentarily retard the flow of the fluid under pressure to the left-hand end of the cylinder 152. This causes the fluid under pressure to enter the right-hand end of the cylinder 70 in Figures 6 and 12 whereupon the piston 75 will move from right to left until the washer 77 engages the right-hand end of the cylinder head 71. Of course, this returns the slide 64, the tubular guide member 63, the shaft 95 and the gears 93 and 94 to their original position during which the plunger or rack 62 returns with, and the same distance as, the tubular guide member, due to the overriding clutch mechanism 102, as has heretofore been described.

When the pressure of the fluid in the pipe 173 has built up sufficiently, the reducing valve 188 permits fluid to continue through the pipe 173 to the left-hand end of the cylinder 152 in Figures 2 and 12. Thus, the piston rod 160 and associated parts will move from left to right in Figures 2 and 12 to move the rack 165 and the pattern form or cam plate 146 in the same direction. Of course, the gears 166 and 170 will then rotate in the opposite direction from that in which they rotated during the active stroke of the platform or workpiece support 55, thereby causing the workpiece support 55 to move from right to left or in an inactive stroke to return to its original position.

The workpiece W will then again be advanced a predetermined distance in the manner heretofore described to thereby complete a cycle in the operation of the machine.

It is thus seen that I have provided an improved pattern controlled mechanism for use in association with a cutting machine of the bandsaw type which is so designed that a plurality of successive articles of identical configuration may be cut from a single workpiece without the necessity of performing any manual operations other than setting up the machine and securing a workpiece to the workpiece feeding mechanism 61. It is evident that such an apparatus greatly increases the productive capacity of a particular machine during a given period and, since no manual operations are necessary in guiding the workpiece past the cutter blade 17, it is evident that all of the articles cut from the workpieces will be of more uniform shape and thickness than has heretofore been possible on machines of this type heretofore in use.

It might be stated that the present apparatus operates most efficiently when liquid pressure is used as the propelling medium, however, it is to be understood that air pressure may also be used or, the racks 62 and 165 may be reciprocated by other means, such as reversible electric motors coupled thereto, if desired.

In the drawings and specification there has been set forth a preferred embodiment of the invention and, although specific terms are employed, they are used in a generic and descriptive sense only and not for purposes of limitation, the scope of the invention being defined in the claims.

I claim:

1. In a bandsaw machine provided with a continuously moving vertically disposed cutter blade having a cutting edge and a table through which the cutter blade passes; the combination of a workpiece support movable on said table, means to secure a workpiece on said workpiece support, said workpiece support having an irregular groove in the lower surface thereof adjacent that edge of the workpiece support disposed adjacent the cutter blade, a first guide element carried by said table and extending into said irregular groove in the workpiece support, said first guide element being disposed adjacent the cutter blade, a pattern form mounted for horizontal movement beneath said table, said workpiece support also having an elongated groove in the lower surface thereof extending in a straight line substantially parallel to the general path of travel of the workpiece support during the cutting of a piece from the workpiece carried thereby, a pivoted lever carried by said table, said pattern form having an irregular pattern groove in the upper surface thereof, second and third guide elements on opposite ends of said lever arm, the second guide element engaging the elongated groove in the lower surface of the workpiece support and the third guide element engaging the pattern groove in the pattern form, and means to move the pattern form in one direction while simultaneously moving the workpiece support in the opposite direction in an active stroke of the workpiece support whereby said lever arm will cause the workpiece support to move in an irregular path past the cutter blade for cutting an irregularly shaped piece of predetermined configuration from the workpiece.

2. In a bandsaw machine provided with a continuously moving vertically disposed cutter blade having a cutting edge and a table through which the cutter blade passes; the combination of a workpiece support movable on said table, means to secure a workpiece on said workpiece support, said workpiece support having an irregular groove in the lower surface thereof adjacent that edge of the workpiece support disposed adjacent the cutter blade, a first guide element carried by said table and extending into said irregular groove in the workpiece support, said first guide element being disposed adjacent the cutter blade, a pattern form mounted for horizontal movement beneath said table, said workpiece support also having an elongated groove in the lower surface thereof extending in a straight line substantially parallel to the general path of travel of the workpiece support during the cutting of a piece from the workpiece carried thereby, a pivoted lever carried by said table, said pattern form having an irregular pattern groove in the upper surface thereof, second and third guide elements on opposite ends of said lever arm, the second guide element engaging the elongated groove in the lower surface of the workpiece support and the third guide element engaging the pattern groove in the pattern form, means to move the pattern form in one direction while simultaneously moving the workpiece support in the opposite direction in an active stroke of the workpiece support whereby said lever arm will cause the workpiece support to move in an irregular path past the cutter blade for cutting an irregularly shaped piece of predetermined configuration from the workpiece, and means operable automatically upon the termination of each active stroke of the workpiece support for returning the workpiece support in an inactive stroke.

3. In a bandsaw machine provided with a continuously moving vertically disposed flat sided cutter blade having a cutting edge and a table through which the cutter blade extends or passes; the combination of a workpiece support movable on said table, a workpiece feeding mechanism carried by said workpiece support, means to secure a workpiece to the workpiece feeding mechanism, said workpiece support having an irregular groove in the lower surface thereof adjacent that edge of the workpiece support disposed adjacent the cutter blade, a first guide element carried by said table and extending into said irregular groove in the workpiece support, said first guide element being disposed adjacent one of the flat sides of said cutter blade, a pattern form mounted for horizontal movement beneath said table, said workpiece support also having a straight groove in the lower surface thereof extending substantially parallel to the general path of travel of the workpiece support during the cutting of a piece from the workpiece carried thereby, a pivoted lever carried by said table, said pattern form having an irregular pattern groove in the upper surface thereof, second and third guide elements on opposite ends of said lever arm, the second guide element engaging the straight groove in the lower surface of the workpiece support and the third guide element engaging the pattern groove in the pattern form, means to move the pattern form in one direction while simultaneously moving the workpiece support in the opposite direction in an active stroke of the workpiece support whereby said lever arm will cause the workpiece support to move in an irregular path past the cutting blade for cutting an irregularly shaped piece of predetermined configuration from the workpiece, means operable automatically upon the termination of each active stroke of the workpiece support for returning the workpiece support in an inactive stroke, and means operable automatically upon the termination of each inactive stroke of the workpiece support for operating the workpiece feeding mechanism to feed the workpiece a predetermined distance relative to the workpiece support.

4. In a bandsaw machine having a vertically disposed constantly moving flat sided cutter blade and a horizontal table through which the cutter blade passes; the combination of a platform slidable upon said table, guide means beneath said table, a pattern plate movable in said guide means beneath said table parallel to the flat sides of said cutter blade, a cylinder fixed beneath said table in substantially parallel relation to said pattern plate and to opposite ends of which a source of fluid under pressure is adapted to be connected, a piston rod mounted for longitudinal movement of said cylinder, a rack fixed to the free end of said piston rod, the lower surface of said platform being provided with a pair of substantially parallel irregular grooves therein conforming substantially to the shape of a piece to be cut from a workpiece adapted to be positioned upon said platform, a follower carried by said table and working in the first of said grooves in the lower surface of said platform and being disposed immediately adjacent one side of said cutter blade, the second of said grooves having projections on one side wall thereof, a sprocket wheel disposed in said second of said grooves and meshing with said projections in said second of said grooves, means connecting one end of said pattern plate to said piston rod, a shaft on which said sprocket wheel is fixedly mounted a pinion fixed on said shaft and meshing with said rack, means for alternately directing fluid under pressure to opposite ends of said cylinder whereby, upon movement of said piston rod in one direction, the rack will cause movement to be imparted to the platform through the medium of the sprocket wheel, and the piston rod will simultaneously cause the pattern plate to move relative to said table, said pattern plate having an irregular pattern groove in the upper surface thereof, a stylus pivotally connected intermediate its ends to the lower surface of said table, follower means on opposite ends of said stylus, an elongated groove in the lower surface of said platform, one of said follower means on the stylus engaging said elongated groove and the other of said follower means on the stylus engaging the irregular groove in the pattern plate whereby, upon reciprocatory movement of the piston rod, the pattern form and the platform will move relative to the saw and the stylus will cause the platform to move in an irregular path for automatically severing a piece of predetermined irregular configuration from the workpiece.

5. In a structure according to claim 4, workpiece feeding means carried by the platform and to which the workpiece is adapted to be connected, and means operable automatically upon each inactive stroke of the platform for effecting operation of the feeding means to feed the workpiece a predetermined distance relative to the platform to subsequently sever a piece from the workpiece of predetermined thickness.

References Cited in the file of this patent

UNITED STATES PATENTS

| Number | Name | Date |
| --- | --- | --- |
| 711,533 | Roper | Oct 21, 1902 |
| 1,793,461 | Biro | Feb. 24, 1931 |
| 2,102,865 | Vickers | Dec. 21, 1937 |
| 2,530,880 | Hermann | Nov. 21, 1950 |
| 2,548,698 | Benge | Apr. 10, 1951 |
| 2,625,965 | Crane | Jan. 20, 1953 |